(12) United States Patent
Ludin et al.

(10) Patent No.: US 10,518,894 B2
(45) Date of Patent: Dec. 31, 2019

(54) FUEL BLADDER MASS ATTENUATION SYSTEM

(71) Applicant: THE BOEING COMPANY, Chicago, IL (US)

(72) Inventors: Douglas R. Ludin, Malvern, PA (US); David T. Misciagna, West Chester, PA (US)

(73) Assignee: THE BOEING COMPANY, Chicago, IL (US)

(*) Notice: Subject to any disclaimer, the term of this patent is extended or adjusted under 35 U.S.C. 154(b) by 145 days.

(21) Appl. No.: 15/481,846

(22) Filed: Apr. 7, 2017

(65) Prior Publication Data

US 2018/0291813 A1   Oct. 11, 2018

(51) Int. Cl.
*B65D 25/14* (2006.01)
*B64D 37/06* (2006.01)
*B64D 37/32* (2006.01)

(52) U.S. Cl.
CPC ............. *B64D 37/06* (2013.01); *B64D 37/32* (2013.01)

(58) Field of Classification Search
CPC ........ B65D 25/14; B64D 37/32; B64D 37/02; B64D 37/04

USPC .... 220/88.1, 88.3, 723, 560.01, 560.02, 721
See application file for complete search history.

(56) References Cited

U.S. PATENT DOCUMENTS

| | | | | |
|---|---|---|---|---|
| 4,262,749 A | * | 4/1981 | Monte | A62C 3/07 169/62 |
| 4,615,455 A | * | 10/1986 | Tansill | B60K 15/03 220/721 |
| 4,785,956 A | * | 11/1988 | Kepler | B29C 53/605 138/30 |
| 5,979,481 A | * | 11/1999 | Ayresman | B60K 15/03 137/14 |
| 2005/0230554 A1 | * | 10/2005 | Schoene | B64D 37/04 244/135 R |
| 2008/0054584 A1 | * | 3/2008 | Leonard | B60G 3/20 280/124.157 |

* cited by examiner

*Primary Examiner* — Stephen J Castellano
(74) *Attorney, Agent, or Firm* — Marshall, Gerstein & Borun LLP

(57) ABSTRACT

A protective assembly includes a gas bag and a fuel container which includes a first wall. The fuel container is positioned within an aircraft and the gas bag extends along the first wall of the fuel container. A method for assembling a protective assembly includes the step of positioning a gas bag within an aircraft such that the gas bag extends along a first wall of a fuel container.

19 Claims, 9 Drawing Sheets

US 10,518,894 B2

FUEL BLADDER MASS ATTENUATION SYSTEM

FIELD

This disclosure relates to a fuel container, bladder or tank for an aircraft and more particularly to a protective assembly which attenuates forces generated from kinetic energy of fuel positioned within a fuel container, bladder or tank during a crash event.

BACKGROUND

Protective assemblies are provided which surround a fuel container, bladder or tank with a material. The material typically employed includes a rigid-cell ballistic foam material positioned surrounding the fuel container or bladder. Fuel containers or bladders on select helicopters are constructed of a reinforced vulcanized rubber material with the rigid-cell ballistic foam material positioned in surrounding relationship to the fuel container or bladder. The rigid-cell ballistic foam material reduces the occurrence of fire with filling voids or pockets within the airframe structure of the aircraft and preventing build-up of fuel vapor. The foam acts to extinguish any sparks resulting from ballistic impacts with airframe components. The foam also provides additional strength to the aircraft structure and slows down the speed of shrapnel during a ballistic event.

Even though certain rigid-cell foam materials employed to surround the fuel container or bladder are capable of attenuating energy by crushing in a crash event, the material is however subject to some amount of rebound since the material can store some energy elastically. The foams used are typically closed cell polyurethane or polyethylene with densities in the range between 1.8 to 5.0 pounds per cubic foot. Surrounding an entire fuel container or bladder with such rigid-cell ballistic foam can add significant weight to an aircraft.

There is a need to provide improved protective assemblies which include fuel containers which attenuate forces or hydrodynamic pressures generated as a result of kinetic energy of the fuel contained within the fuel container or bladder of an aircraft at the time of a crash event. This is particularly the case for those fuel containers or bladders constructed of reinforced vulcanized rubber material or otherwise having a flexible wall construction. There is a need to protect support structures adjoining the fuel container or bladder within the aircraft from the hydrodynamic pressures at the time of a crash event to reduce the occurrence of imparting damage to the support structures. Damage imparted to support structures of the aircraft impedes the ability of the aircraft structure to in turn protect the occupants.

There is also a need to reduce the occurrence of fire upon an occurrence of a rupture of the fuel container or bladder by way of a crash event or as a result of a ballistic event. Also, there is a need to provide protection to support structures within the aircraft, as mentioned above, enabling designers to design lighter weight structures which is beneficial to aircraft manufactures and to the optimization of the operation of the aircraft.

SUMMARY

An example of a protective assembly includes a gas bag and a fuel container which includes a first wall. The fuel container is positioned within an aircraft and the gas bag extends along the first wall of the fuel container.

An example of a method for assembling a protective assembly includes the step of positioning a gas bag within an aircraft such that the gas bag extends along a first wall of a fuel container.

The features, functions, and advantages that have been discussed can be achieved independently in various embodiments or may be combined in yet other embodiments further details of which can be seen with reference to the following description and drawings.

DESCRIPTION

Figure 1:
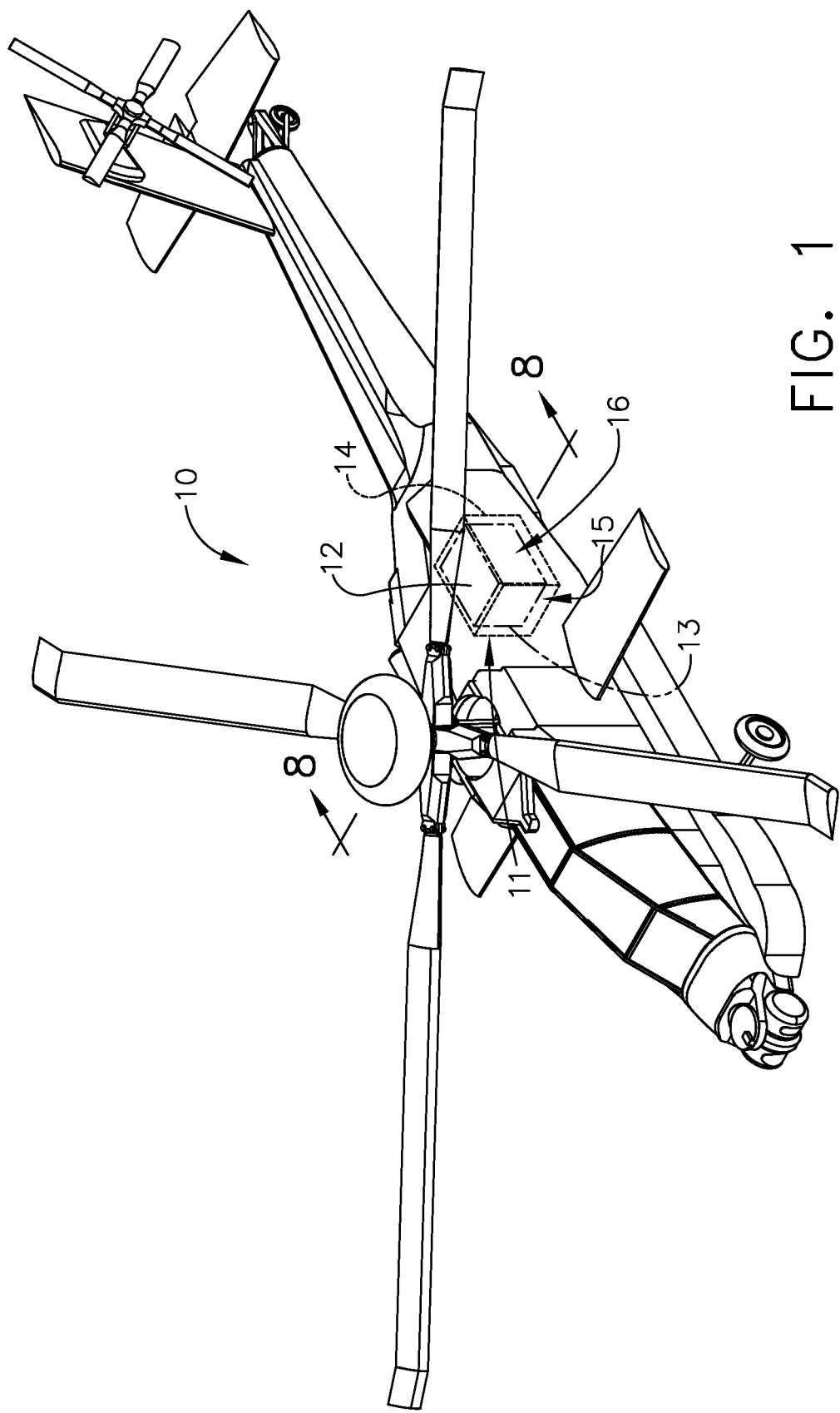
FIG. 1 is a perspective view of a helicopter showing in phantom the protective assembly including a fuel container and a gas bag in protective position with respect to the fuel container.

In referring to FIG. 1, aircraft or helicopter 10 is shown with protective assembly 11 which includes fuel tank, container or bladder 12 positioned within helicopter 10 wherein fuel container 12 is constructed of first wall 13 and gas bag 14 which extends along first wall 13. In this example, as will be discussed in more detail herein, gas bag 14 extends along bottom side 15, as seen in FIGS. 2-5 and 7 of first wall 13 of fuel container 12 and along a lateral side 16 of first wall 13 around fuel container 12. In this example, gas bag 14 is not positioned to extend along top side 18 of fuel container 12. This construction minimizes addition of weight of gas bag 14 being positioned along top side 18 of first wall 13. Top side 18 is in a position within helicopter 10 which requires less demand for force attenuation in a crash event in order to protect support structures adjoining fuel container 12. Moreover, top side 18 of first wall of fuel container 12 is in a position less likely to receive a ballistic impact for which gas bag 14 would provide fire preventative measures, which will be discussed in more detail herein.

Two examples of protective assembly 11 and 11' will be discussed herein which differ from one another in that the first example includes gas bag 14 having an open undivided interior 28 as seen for example in FIG. 2. The second example includes gas bag 14 being subdivided with at least one compartment 20 having an interior 28' positioned within gas bag 14, as seen in FIGS. 3-8, which shows an example of gas bag 14 having a plurality of compartments 20. In the following discussion of both the first and second examples of protective assembly 11 and 11', elements that are similar between the first and second examples of protective assembly 11 and 11', will have the same numbered elements.

Figure 2:
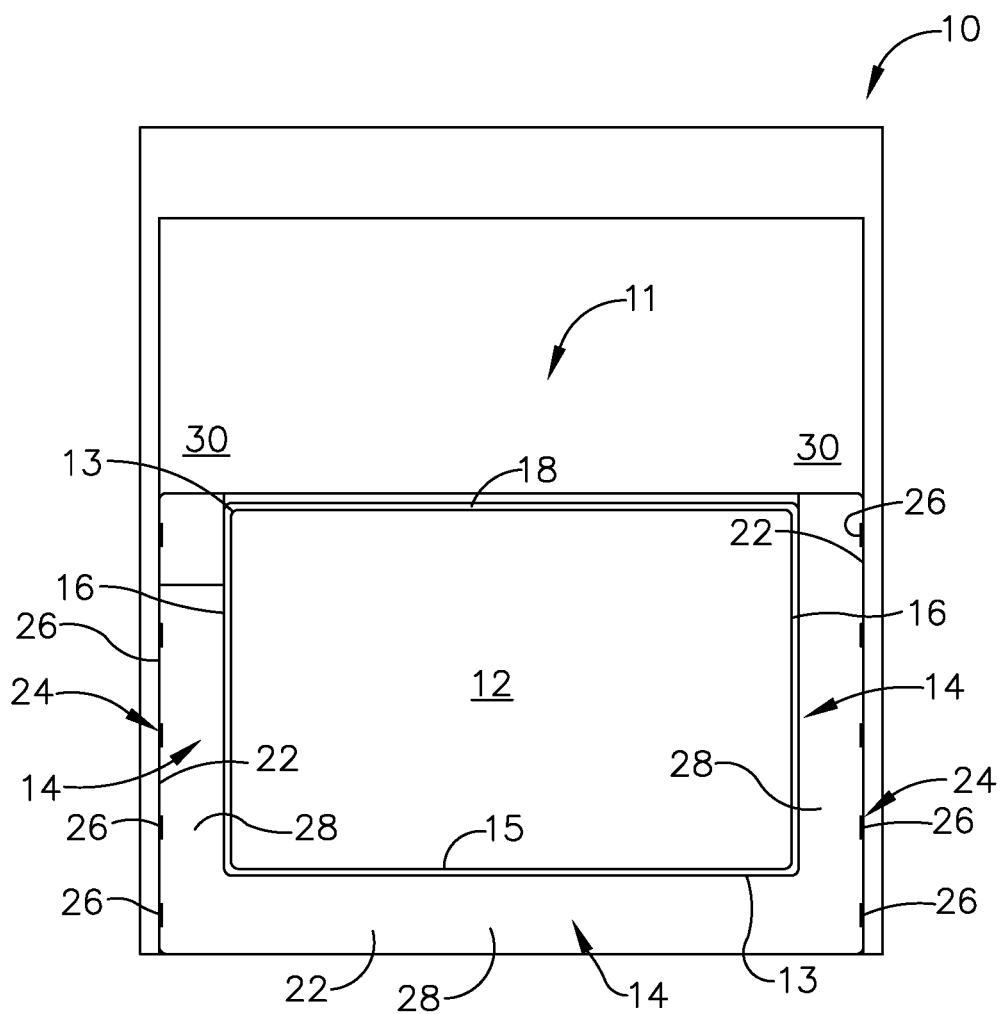
FIG. 2 is a schematic cross section view of a first example of the protective assembly.

In referring to FIG. 2, fuel container 12 of first sample of protective assembly 11 is constructed of a reinforced vulcanized rubber material. The decelerating fuel mass contained in fuel container 12 generates kinetic energy resulting in hydrodynamic pressures being exerted, in particular, against lateral side 16 and bottom side 15 of first wall 13 of fuel container 12 upon a sudden stop of helicopter 10 such as in a vertical impact crash event. The hydrodynamic pressure force pushes against lateral side 16 and bottom side 15 of first wall 13 at the time of a crash event, which in turn, with fuel tank 12 having a flexible construction, first wall 13 exerts such force against gas bag 14.

Gas bag 14 contains in this example a pressurized gas. The gas is inert gas and includes at least one of variety of the following inert gases such as nitrogen, argon and other known inert gases. The inert gas, as will be described herein, can be released within helicopter 10 upon being pierced by a ballistic event releasing the inert gas in the proximity of fuel container 12 reducing an occurrence of an incendiary event and can be released within helicopter 10 at a time of a crash event which will be described herein.

The inert gas is pressurized within gas bag 14 in a pressure range in this example which includes five pounds per square inch up to and including thirty pounds per square inch. Other pressures can be selected by the user as needed for a particular application of a ballistic and or crash event. In a case of gas bag 14 is hit by a projectile or shrapnel, escaping inert gas will extinguish sparks in or around gas bag 14. With gas bag 14 pressurized, at the time of a crash event, the kinetic energy generated by the fuel contained within fuel container 12 causes a hydrodynamic pressure to be exerted against first wall 13 of fuel tank 12, as mentioned above, and in turn exerted against gas bag 14. With the force application being made against gas bag 14, the pressurized inert gas in gas bag 14 elevates from an initial pressure at which gas bag 14 was pressurized. As will be discussed in more detail below, the elevated pressure will facilitate gas bag 14 to attenuate the forces from the hydrodynamic pressures being exerted by the fuel.

Figure 7:
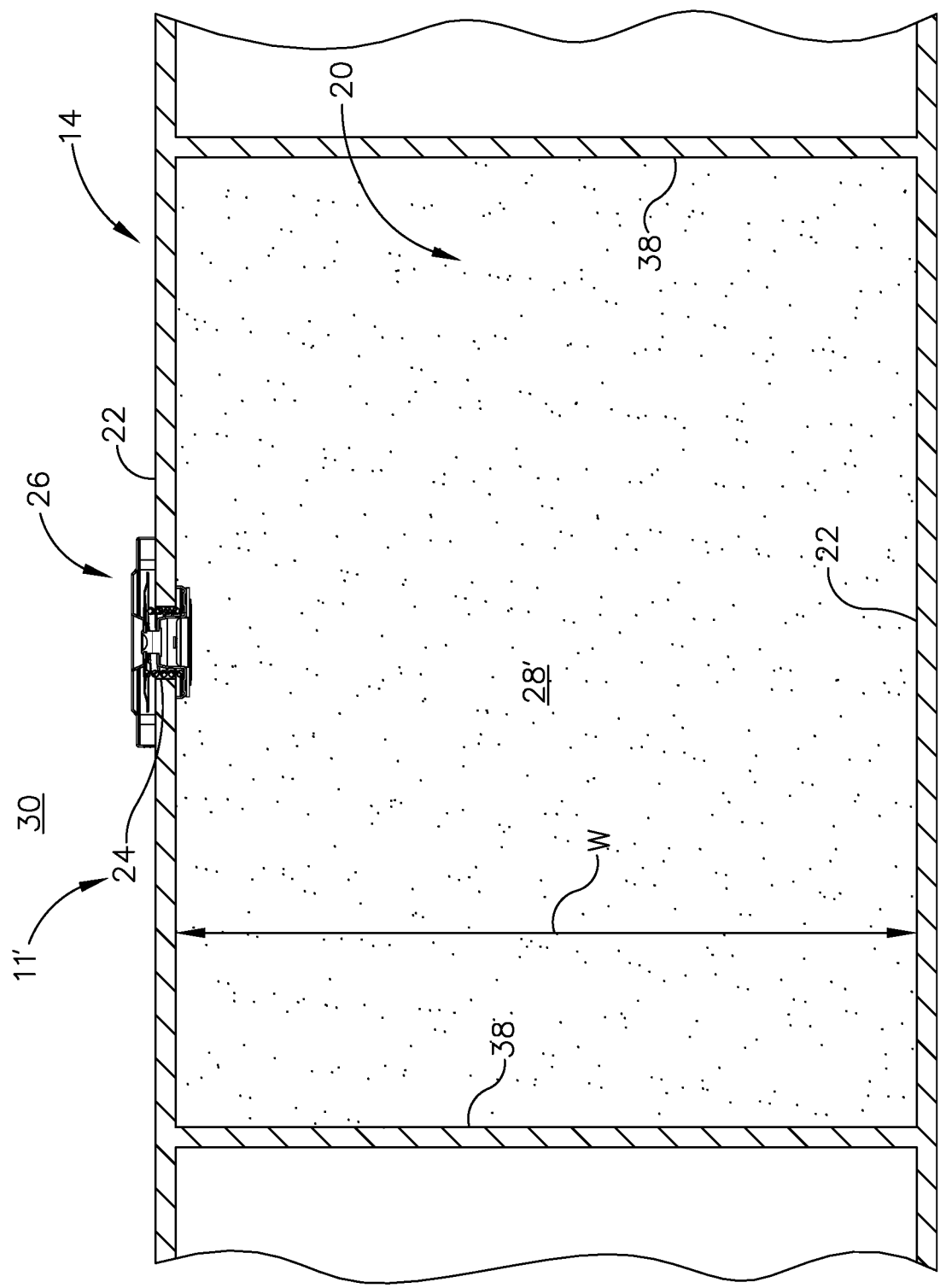
FIG. 7 is a cross section view of the gas bag as seen along line 7-7 of FIG. 5.

Gas bag 14 includes an exterior wall 22 which defines an opening 24 and includes a pressure release valve 26 associated with opening 24. This construction, can be seen representatively in FIG. 7, shows pressure release valve 26 associated with opening 24 for the second example of protective assembly 11'. Pressure release valve 26, in this first example of protective assembly 11 as shown in FIG. 2, is positioned within opening 24 and is in fluid communication with interior 28 of gas bag 14 and with exterior 30 of gas bag 14. Pressure release valve 26 can be selected by the fabricator to open and activate protective assembly 11 at a desired threshold pressure which will be a pressure, as discussed above, elevated from the initial pressure of gas bag 14. The fabricator can also select the orifice size of the pressure release valve 26 for obtaining a desired flow rate of the inert gas from interior 28 so as to release the elevated pressurized inert gas at a rate to facilitate operation of gas bag 14. The selection of the pressure release threshold and the size of the orifice provides the attenuation of the applied hydrodynamic pressure force exerted by the fuel at the time of the crash event as needed. The attenuation of the hydrodynamic pressure forces protects support structures proximate to fuel container 12 and maintains optimal protection to the occupants of helicopter 10 at the time of a crash event.

Gas bag 14 is constructed in this example of a non-permeable material such as Kapton, Mylar, metal coated or another material capable of containing an inert gas. Reinforcement material for gas bag 14 can be a knitted or stitched woven material. All stitches are taped with non-permeable material so that the stitching will not leak the inert gas from gas bag 14. This can be accomplished by either using a pressure sensitive tape or a thermoplastic welding process such as ultra-Sonics, heat, induction or radio frequency welding. Restraint or reinforcement materials can be used such as Vectran, Spectra, Dynema, Kevlar, Nylon or other fiber that can accommodate crash loads.

In this example a plurality of pressure release valves 26 are positioned spaced apart along exterior wall 22 of gas bag 14. Gas bag 14 is positioned within helicopter 10 such that pressure release valves 26 are not obstructed. With pressure release valves 26 unobstructed, the inert gas is permitted to freely flow out of gas bag 14 from pressure release valve 26 and gas bag 14 such that gas bag 14 can attenuate the hydrodynamic pressure forces from fuel container 12. If needed, a conduit, channel and/or port within helicopter 10 can be employed with pressure release valves 26 to facilitate a free and unobstructed gas flow out of gas bag 14 through pressure release valve 26 and if needed, to direct the out flow of the inert gas to a location as desired.

With pressure release valve 26 in a closed position, interior 28 of gas bag 14 is closed from exterior 30 of gas bag 14. With pressure release valve 26 in an open position, interior 28 of gas bag 14 is in fluid communication with the exterior 30 of gas bag 14 through pressure release valve 26. Pressure release valve 26 can also be mechanically or electrically controlled to facilitate force attenuation by gas bag 14 as needed.

Figure 3:
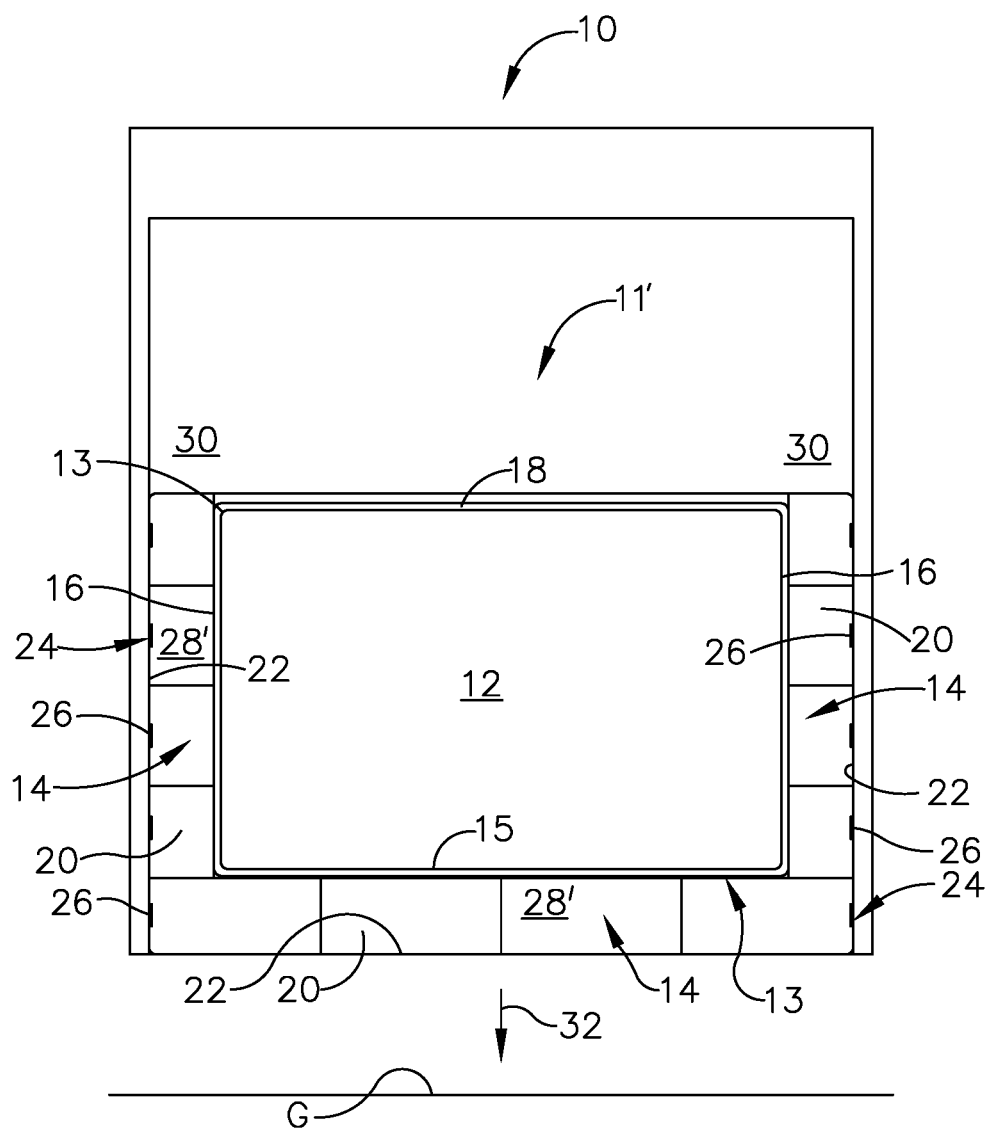
FIG. 3 is a schematic cross section view of a second example of the protective assembly in an aircraft prior to the aircraft incurring a crash impact event.
Figure 4:
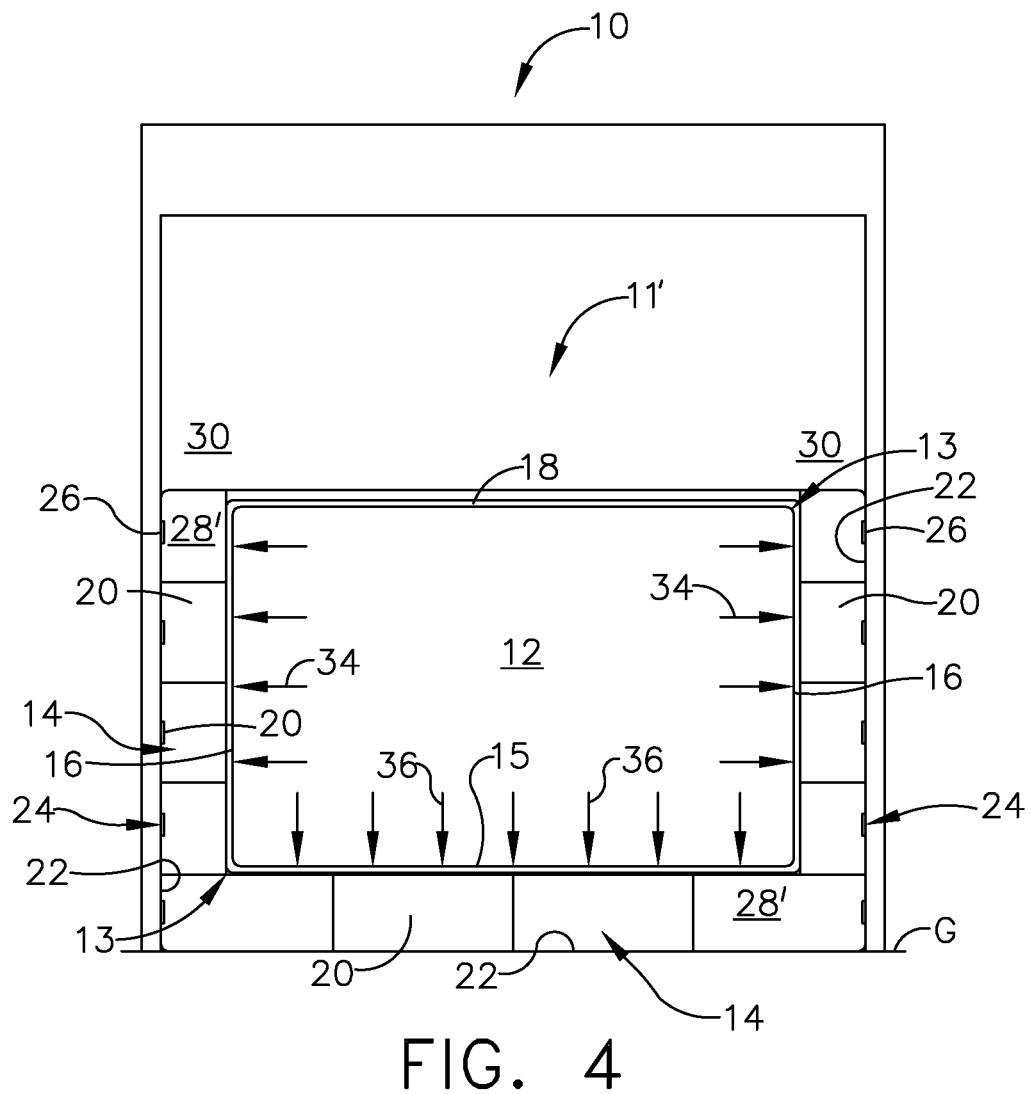
FIG. 4 is a schematic cross section view of the second example of the protective assembly of FIG. 3 in an aircraft at the time of the aircraft incurs a crash impact event.
Figure 5:
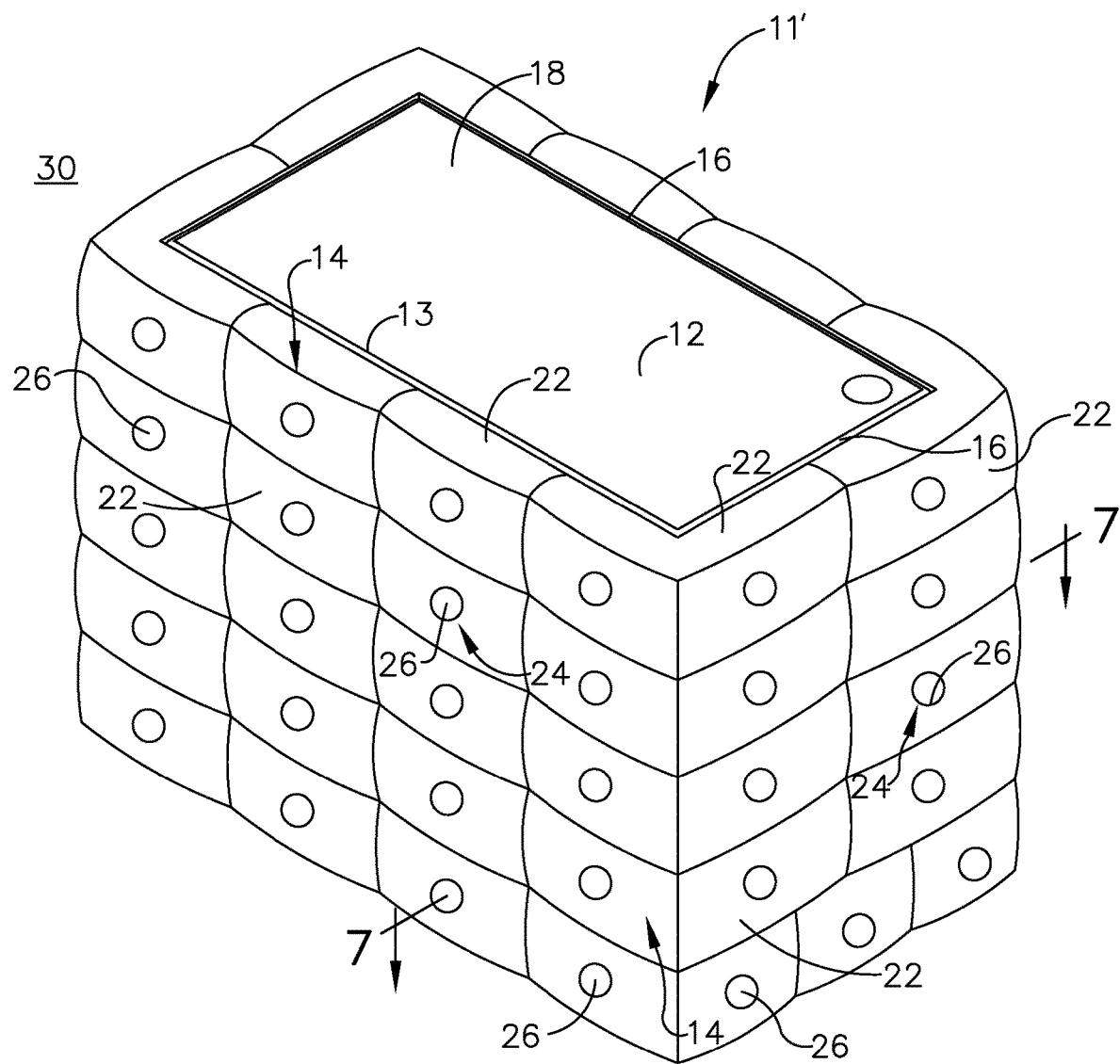
FIG. 5 is a perspective view of the second example of the protective assembly of FIG. 3.

An example of the performance of the second example of protective assembly 11' is schematically shown in FIGS. 3 and 4. As mentioned above, second example of protective assembly 11' includes gas bag 14 including at least one compartment 20 within gas bag 14. In the second example shown in FIGS. 3 and 4, a plurality of compartments 20 are shown that subdivide gas bag 14. In FIG. 3 helicopter 10 is moving in direction 32 toward ground G. At this point helicopter 10 has not impacted ground G and protective assembly 11' is in a pre-impact non-activated state. In FIG. 4, helicopter 10 has incurred a crash event with ground G. The inertia of the fuel contained in fuel container 12 has kinetic energy which exerts a hydrodynamic force against first wall 13 of fuel container 12 on lateral side 16 and bottom side 15 of first wall 13 as shown by arrows 34 and 36, respectively. It is at this time hydrodynamic pressure force is transmitted through first wall 13 on bottom side 15 and lateral side 16 of fuel container 12 and onto gas bag 14 against a plurality of compartments 20 positioned within gas bag 14. If sufficient force is imparted against compartments 20 protective assembly 11' is activated with opening of pressure release valve 26.

Gas bag 14 includes at least one compartment 20 positioned within gas bag 14 and in this example a plurality of compartments 20, as seen in FIGS. 3, 4, 6 and 7. Exterior wall 22 of gas bag 14 defines opening 24, as shown in FIG. 7 and pressure release valve 26 is, in this example, positioned within and extending through opening 24 of exterior wall 22 into interior 28' of the at least one compartment 20. Pressure release valve 26 is in fluid communication with interior 28' of the at least one compartment 20 positioned within gas bag 14 and is also in fluid communication with exterior 30 of gas bag 14. In this example, each compartment 20 has its own pressure release valve 26. As described earlier, with pressure release valve 26 in a closed position, interior 28' of the at least one compartment 20 is closed from exterior 30 of gas bag 14 and with pressure release valve 26 in an open position, interior 28' of the at least one compartment 20 is in fluid communication with exterior 30 of gas bag 14.

In this second example of protective assembly 11', each pressure release valve 26 for each compartment can be set by the fabricator for a desired threshold pressure to open as described earlier for gas bag 14 for protective assembly 11. The fabricator can set a select threshold pressure for triggering pressure release valve 26 to open and can select the orifice size for pressure release valve 26 to obtain a desired flow rate of the pressurized inert gas from the interior 28' of compartment 20. The fabricator's selection of the threshold pressure and the orifice size for pressure release valve 26 allows the fabricator to facilitate the desired force attenuation provided by compartments 20 and gas bag 14. As mentioned above for protective assembly 11, pressure release valves 26 of each compartment 20 for protective assembly 11' can be mechanically or electronically controlled to obtain the optimum force attenuation to protect adjoining support structures within helicopter 10.

Gas bag 14 of protective assembly 11' can be similarly constructed as described above with respect to gas bag 14 in protective assembly 11. In the instance of gas bag 14 of protective assembly 11', compartments 20 are constructed utilizing the similar material as described above in constructing gas bag 14 in protective assembly 11. In referring to FIGS. 5-7, gas bag 14 has exterior wall 22 similarly as gas bag 14 of protective assembly 11. In both protective assembly 11 and 11' exterior wall 22 is a continuous wall enclosing gas bag 14. Gas bag 14 can be constructed of a continuous exterior wall 22 or assembled and connected together in segments.

In referring to FIG. 7, compartment 20 of protective assembly 11' is constructed to extend across width W of gas bag 14. In other embodiments, compartments 20 can take on selected shapes and size. Compartments 20 can extend across width W or a portion thereof. Compartment 20 has a pressure release valve 26 which controls the containment and release of the inert gas within compartment 20 and permits the inert gas to flow to exterior 30 of gas bag 14 allowing gas bag 14 to attenuate forces received from the hydrodynamic pressures of the fuel contained within fuel container 12.

Figure 6:
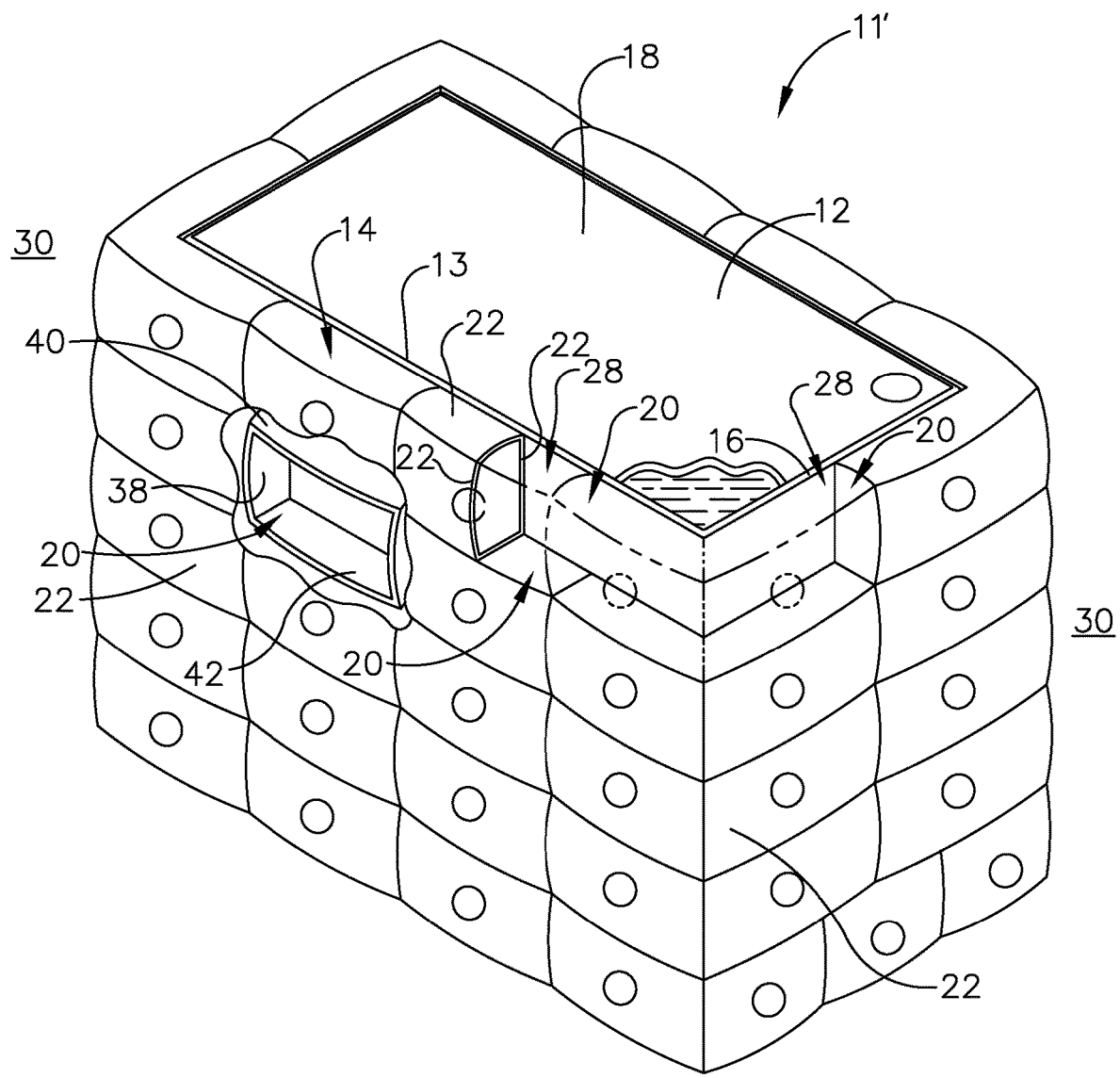
FIG. 6 is a partial broken away view of the protective assembly of FIG. 5 including the gas bag with phantom representation of compartments within the gas bag and a partial broken away view of a portion of a top side of the fuel container.

In the present example as seen in FIG. 7, sidewalls 38 of compartment 20 are welded to exterior wall 22. Other conventional ways of securing sidewalls 38 to exterior wall 22 can be employed. Top and bottom walls 40, 42, as seen in FIG. 6, enclose compartment 20 and are similarly connected to exterior wall 22 of gas bag 14 as were sidewalls 38 mentioned above. Top and bottom walls 40, 42 are also similarly connected to sidewalls 38 as they are connected to exterior wall 22 thereby connecting top and bottom walls 40, 42 to sidewalls 38. In this example, compartment 20 forms a generally rectangularly box shaped enclosure.

Each compartment 20 is enclosed and in this example sealed from an adjacent compartment 20. Each compartment 20 has a pressure release valve 26 to provide each compartment 20 the desired force attenuation functionality. Each of pressure release valves 26 will be maintained unobstructed, as described above for pressure release valves 26 for gas bag 14 of protection assembly 11, to permit free flow of inert gas from interior 28' of compartment 20 through pressure release valves 26 to exterior 30. The free flow of the inert gas permits the desired attenuation functionality of compartments 20 and provides the reduction of an occurrence of fire.

As described above for the function of pressure release valve 26 and gas bag 14 for protective assembly 11, pressure release valve 26 with respect to gas bag 14 functions similarly for protective assembly 11'. With pressure release valve 26 in a closed position interior 28' of the at least one compartment 20 is closed from exterior 30 of gas bag 14 and with pressure release valve 26 in an open position, interior 28' of the at least one compartment 20 is in fluid communication with exterior 30 of gas bag 14.

Compartments 20 of gas bag 14 contain an inert gas as described above for gas bag 14 of protective assembly 11. Compartments 20 contain inert gas pressurized within compartment 20 in a pressure range which includes five pounds per square inch up to and including thirty pounds per square inch. Gas bag 14 with pressure release valve 26 provides compartments 20 the capability of attenuating forces from fuel container 12 in a crash event. The inert gas whether released from compartments 20 by way of pressure release valves 26 being opened as a result of a crash event or by the way of a ballistic event wherein exterior wall 22 of gas bag 14 is pierced, the inert gas reduces the incidence of fire with respect to either event.

Figure 8:
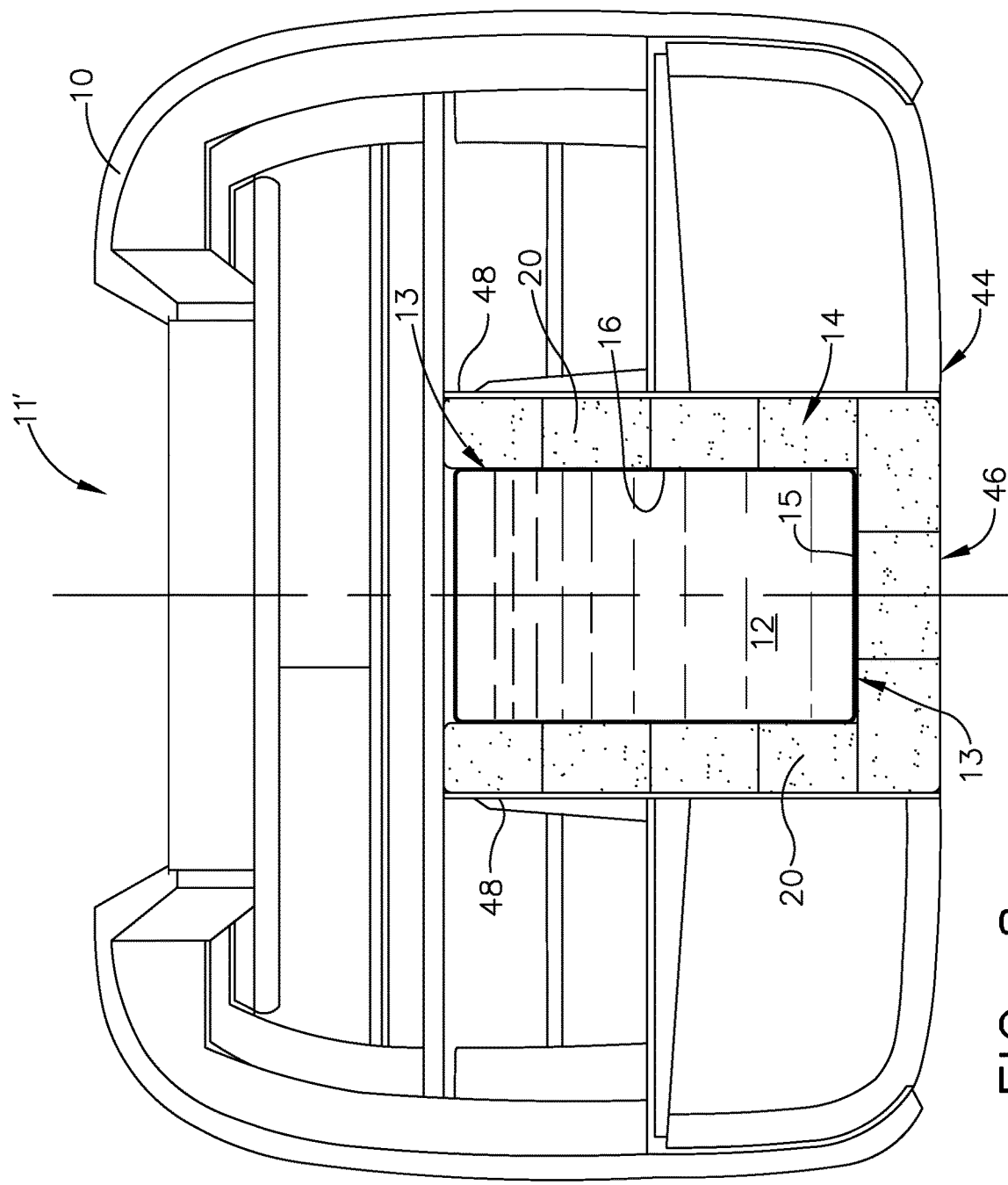
FIG. 8 is a cross section view of the helicopter along with the second example of the protective assembly as seen along line 8-8 of FIG. 1.

In referring to FIG. 8, an example view of protective assembly 11' is shown wherein the first wall 13 of the fuel container 12 includes bottom side 15 which faces a bottom portion 44 of aircraft 10 and first wall 13 and includes a lateral side 16 which extends in a direction away from bottom portion 44 of aircraft 10. As described earlier, fuel container 12 is constructed of a reinforced vulcanized rubber material which provides for a flexible first wall 13. Gas bag 14 in this example abuts bottom side 15 of first wall 13 of fuel container 12. Also in this example, gas bag 14 is positioned between bottom side 15 of first wall 13 of fuel container 12 and skin 46 of aircraft 10 and also abuts skin 46. Gas bag 14 abuts lateral side 16 of first wall 13 of fuel container 12 and is positioned between lateral side 16 of first wall 13 of fuel container 12 and structural member 48 of aircraft 10. Structural member 48, in this example, is a bulk head within helicopter 10 but can also include other support structures for helicopter 10 such as a skin of helicopter 10 or can be other structures depending on the particular design of helicopter 10 and the location of fuel container 12.

Figure 9:
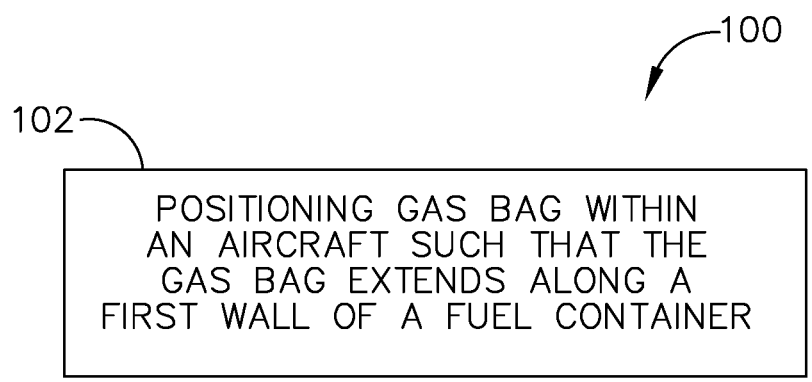
FIG. 9 is a flow chart of the method for assembling a protective assembly.

Also included is method 100 for assembling a protective assembly as seen in FIG. 9. Method 100 includes step 102 of positioning gas bag 14 within aircraft 10 such that gas bag 14 extends along first wall 13 of fuel container 12. The step of positioning gas bag 14 within aircraft 10 includes, in one example, gas bag 14 having exterior wall 22 which defines opening 24 and includes pressure release valve 26 associated with opening 24. Pressure release valve 26 is positioned in a fluid flow blocking relationship between within gas bag 14 and exterior 30 of gas bag 14 with pressure release valve 26 in a closed position and is positioned in a fluid flow non-blocking relationship between within gas bag 14 and exterior 30 of gas bag 14 with pressure release valve 26 in an open position. Further included is fuel container 12 constructed of a reinforced vulcanized rubber material and a step of pressurizing gas bag 14 with an inert gas. In this example, pressure release valve 26 as seen in FIG. 7 is positioned within opening 24.

The step of positioning gas bag 14, in another example, further includes gas bag 14 including an exterior wall 22 and gas bag 14 including at least one compartment 20 positioned within gas bag 14. This example further includes pressure release valve 26 associated with opening 24 defined in exterior wall 22 such that exterior 30 of gas bag 14 and an interior 28' of the at least one compartment 20 are in fluid communication with pressure release valve in a fluid flow non-blocking relationship between interior 28' of the at least one compartment 20 and exterior 30 of gas bag 14 with pressure release valve 26 in an open position. With pressure release valve 26 in a fluid flow blocking relationship between interior 28' of the at least one compartment 20 and exterior 30 of gas bag 14, exterior 30 of gas bag 14 and interior 28' of at least one compartment 20 are not in fluid communication with pressure release valve 26 in a closed position.

Step 102 of positioning gas bag 14 within aircraft 10 such that gas bag 14 extends along first wall 13 of fuel container 12, further includes positioning gas bag 14 along bottom side 15 of first wall 13 of fuel container 12 wherein bottom side 15 of first wall 13 of fuel container 12 faces a bottom portion 44 of aircraft 10. Further included is positioning gas bag 14 along lateral side 16 of first wall 13 of fuel container 12 which extends in a direction away from bottom portion 44 of aircraft 10.

Step 102 of positioning gas bag 14 within aircraft 10 further includes abutting gas bag 14 against first wall 13 of fuel container 12 and positioning gas bag 14 between first wall 13 of fuel container 12 and a structure of aircraft 10. In this example, structure of helicopter 10 can include various structures of helicopter 10. The structure can include skin 46, bulkhead 48 or other structures of helicopter 10 depending on the particular design of helicopter 10 and the location of fuel container 12.

While various embodiments have been described above, this disclosure is not intended to be limited thereto. Variations can be made to the disclosed embodiments that are still within the scope of the appended claims.

What is claimed:

1. A protective assembly, comprising:
    a gas bag, wherein;
        the gas bag comprises an exterior wall which defines an opening; and
        further including a pressure release valve associated with the opening and in fluid communication with an interior of the gas bag and an exterior of the gas bag; and
    a fuel container comprising a first wall, wherein
        the fuel container is positioned within an aircraft; and
        the gas bag extends along the first wall outside of the fuel container.

2. The protective assembly of claim 1, wherein the gas bag contains an inert gas.

3. The protective assembly of claim 2, wherein the inert gas is pressurized within a pressure range which includes five pounds per square inch up to and including thirty pounds per square inch.

4. The protective assembly of claim 1, wherein the fuel container is constructed of a reinforced vulcanized rubber material.

5. The protective assembly of claim 1, wherein:
    the first wall of the fuel container comprises a bottom side which faces a bottom portion of the aircraft;
    the first wall of the fuel container comprises a lateral side of the first wall which extends in a direction away from a bottom portion of the aircraft; and
    the fuel container is constructed of a reinforced vulcanized rubber material.

6. The protective assembly of claim 5, wherein the gas bag abuts the bottom side of the first wall of the fuel container.

7. A method for assembling a protective assembly, comprising:
    positioning a gas bag to extends along an outside of a first wall of a fuel container, wherein:
        the fuel container is positioned within an aircraft; the gas bag extends along the first wall outside of the fuel container;
        the gas bag comprising an exterior wall which defines an opening; and
        the gas bag further including a pressure release valve associated with the opening and in fluid communication with an interior of the gas bag and an exterior of the gas bag.

8. The method of claim 7, wherein
    the pressure release valve is associated with the opening such that the pressure release valve is positioned in a fluid flow blocking relationship between the interior of the gas bag and the exterior of the gas bag with the pressure release valve in a closed position and the pressure release valve is positioned in a fluid flow non-blocking relationship between the interior of the gas bag and the exterior of the gas bag with the pressure release valve in an open position;
    the fuel container is constructed of a reinforced vulcanized rubber material; and
    positioning the gas bag further includes pressurizing the gas bag with an inert gas.

9. The method of claim 7, wherein:
    the gas bag comprising at least one compartment positioned within the gas bag; and
    the pressure release valve is associated with the opening defined in the exterior wall of the gas bag such that the exterior of the gas bag and the interior of the at least one compartment are in fluid communication with the pressure release valve, so that with the pressure release valve in an open position, the pressure release valve is in a non-blocking relationship between the interior of the at least one compartment and the exterior of the gas bag and with the pressure release valve in a closed position, the pressure release valve is in a fluid flow blocking relationship between the interior of the at least one compartment and the exterior of the gas bag.

10. The method of claim 7, further including:
    positioning the gas bag along a bottom side of the first wall of the fuel container wherein the bottom side of the first wall of the fuel container faces a bottom portion of the aircraft; and
    positioning the gas bag along a lateral side of the first wall of the fuel container which extends in a direction away from the bottom portion of the aircraft.

11. The method of claim 7, further including positioning the gas bag to abut against the first wall of the fuel container.

12. The method of claim 7, further including positioning the gas bag between the first wall of the fuel container and a structure of the aircraft.

13. A protective assembly, comprising:
    a gas bag, comprising:
        a compartment positioned within the gas bag;
        an exterior wall which defines an opening;
        further including a pressure release valve associated with the opening and is in fluid communication with an interior of the compartment and an exterior of the gas bag; and a fuel container comprising a first wall, wherein:
the fuel container is positioned within an aircraft; and
the gas bag extends along the first wall outside of the fuel container.

14. The protective assembly of claim 13, wherein the at least one compartment contains an inert gas.

15. The protective assembly of claim 14, wherein the inert gas is pressurized within the at least one compartment in a pressure range which includes five pounds per square inch up to and including thirty pounds per square inch.

16. The protective assembly of claim 13, further includes the pressure release valve is positioned extending through the opening of the exterior wall of the gas bag and into an interior of the at least one compartment.

17. The protective assembly of claim 13, wherein with the pressure release valve in a closed position the interior of the at least one compartment is closed from the exterior of the gas bag and with the pressure release valve in an open position, the interior of the at least one compartment is in fluid communication with the exterior of the gas bag.

18. A protective assembly, comprising:
a gas bag, wherein:
the gas bag comprises a compartment positioned within the gas bag;
the gas bag comprises an exterior wall which defines an opening; and
a pressure release valve is associated with the opening and is in fluid communication with an interior of the compartment and an exterior of the gas bag; and
a fuel container comprising a first wall, wherein
the fuel container is positioned within an aircraft;
the gas bag extends along the first wall outside of the fuel container;
with the pressure release valve in a closed position the interior of the at least one compartment is closed from the exterior of the gas bag and with the pressure release valve in an open position, the interior of the at least one compartment is in fluid communication with the exterior of the gas bag;
the gas bag is positioned between the bottom side of the first wall of the fuel container and a skin of the aircraft; and
the gas bag abuts the skin of the aircraft.

19. A protective assembly, comprising:
a gas bag, wherein:
the gas bag comprises a compartment positioned within the gas bag;
the gas bag comprises an exterior wall which defines an opening; and
a pressure release valve is associated with the opening and is in fluid communication with an interior of the compartment and an exterior of the gas bag; and
a fuel container comprising a first wall, wherein
the fuel container is positioned within an aircraft;
the gas bag extends along the first wall outside of the fuel container;
with the pressure release valve in a closed position the interior of the at least one compartment is closed from the exterior of the gas bag and with the pressure release valve in an open position, the interior of the at least one compartment is in fluid communication with the exterior of the gas bag; and
the gas bag abuts a lateral side of the first wall of the fuel container and is positioned between the lateral side of the first wall of the fuel container and a structural member of the aircraft.

* * * * *